(12) United States Patent
Pope et al.

(10) Patent No.: US 11,032,170 B1
(45) Date of Patent: Jun. 8, 2021

(54) REMOTELY-DEPLOYED AUTOMATED COMPUTER NETWORK DIAGNOSTIC TOOL

(71) Applicant: Bank of America Corporation, Charlotte, NC (US)

(72) Inventors: David Pope, Jacksonville, FL (US); Douglas W. Monroe, Washington Crossing, PA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/799,948

(22) Filed: Feb. 25, 2020

(51) Int. Cl.
*H04L 12/26* (2006.01)
*H04L 12/24* (2006.01)

(52) U.S. Cl.
CPC .......... *H04L 43/06* (2013.01); *H04L 41/046* (2013.01); *H04L 43/045* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 6,823,479 B1 | 11/2004 | McElhaney, Jr. et al. | |
| 6,973,491 B1* | 12/2005 | Staveley | H04L 41/0253 709/223 |
| 7,769,850 B2 | 8/2010 | Silverman | |
| 7,986,632 B2 | 7/2011 | Monaco et al. | |
| 8,432,898 B2 | 4/2013 | Samele et al. | |
| 9,742,638 B1* | 8/2017 | McCabe | H04L 41/5009 |
| 10,200,267 B2 | 2/2019 | Zafer et al. | |
| 2011/0149720 A1* | 6/2011 | Phuah | H04L 43/50 370/216 |
| 2012/0173691 A1* | 7/2012 | Kothe | H04L 41/0226 709/223 |

(Continued)

OTHER PUBLICATIONS

"Static Real-Time Dashboard," https://subscription.packtpub.com/book/big_data_and_business_intelligence/9781785889462/6/ch06lvl1sec52/static-real-time-dashboard, Retrieved on Jan. 9, 2020.

(Continued)

*Primary Examiner* — Lance Leonard Barry
(74) *Attorney, Agent, or Firm* — Weiss & Arons LLP; Michael A. Springs, Esq.

(57) ABSTRACT

Systems and methods are provided for a remotely-deployed, automated, computer network diagnostic tool. Methods may include deploying a diagnostic script from a central network node to multiple network endpoints via an automated network agent tool, and running the diagnostic script on each of the multiple endpoints. Running the script on each endpoint may include compiling a set of URLs, compiling a set of proxy servers, testing a plurality of network paths, and generating a set of diagnostic data for each endpoint. Diagnostic data may include a success status, a latency performance score, and a response size measurement. Methods may include collating the sets of diagnostic data, generated from the multiple endpoints, into a collated set of diagnostic data. Methods may include analyzing the collated set of diagnostic data, via a big-data analysis tool, based on a set of performance metrics. Based on the analyzing, methods may include generating a diagnostic network report, and/or a flag when a network performance issue is detected.

13 Claims, 5 Drawing Sheets

(56) References Cited

U.S. PATENT DOCUMENTS

| | | | | |
|---|---|---|---|---|
| 2012/0320784 | A1* | 12/2012 | Edwards | H04L 43/04 370/252 |
| 2014/0229614 | A1* | 8/2014 | Aggarwal | H04M 3/2236 709/224 |
| 2016/0119204 | A1* | 4/2016 | Murasato | H04L 41/22 715/735 |
| 2017/0257258 | A1* | 9/2017 | Bingham | G06F 11/3006 |
| 2019/0188068 | A1* | 6/2019 | Mane | H04L 41/0645 |
| 2020/0077129 | A1* | 3/2020 | Jones | H04N 21/2407 |

OTHER PUBLICATIONS

"What is a Proxy Server and How Does It Work?" https://www.varonis.com/blog/what-is-a-proxy-server/, Inside Out Security, Retrieved on Feb. 6, 2020.

"Splunk," https://en.wikipedia.org/wiki/Splunk, Wikimedia Foundation, Inc., Jan. 28, 2020.

* cited by examiner

REMOTELY-DEPLOYED AUTOMATED COMPUTER NETWORK DIAGNOSTIC TOOL

FIELD OF TECHNOLOGY

Aspects of the disclosure relate to computer systems. Specifically, aspects of the disclosure relate to systems and methods for providing computer network diagnostic tools.

BACKGROUND OF THE DISCLOSURE

Computer networks may include a large number of constituent nodes that may be distributed over vast distances. Each node may be an individual computing device or a sub-network consisting of multiple computing devices. Some or all of the nodes may be connected to the network via one or more proxy servers.

The nodes, computing devices, and/or proxy servers may be interconnected via a large number of network paths. The computing devices may be configured to communicate over the network. The communications may be executed via the network paths. The network paths may include other network nodes.

The complex nature of a large-scale distributed computer network creates a unique set of challenges. One challenge may include identifying, locating, or diagnosing network problems. For example, the problem may include a hardware, software, or other network component malfunction. The problem may cause delays and/or errors in certain network communications. However, an adversely affected communication may go unnoticed. The affected communication may be noticed, but it may be very difficult to ascertain which portion of the network is causing the problem.

It would be desirable, therefore, to provide systems and methods for automated diagnostic tools that identify and locate malfunctioning portions of large, complex, distributed computer networks.

SUMMARY OF THE DISCLOSURE

Aspects of the disclosure relate to a platform for identifying malfunctioning portions of a distributed computer network. The computer network may include a plurality of nodes. The nodes may include a central server and a plurality of endpoints.

The platform may include an automated network agent module. The automated network agent module may be based on the central server and may be configured to deploy and run a diagnostic script on two or more of the endpoints.

Each instance of running the diagnostic script at an endpoint may be configured to compile a set of uniform resource locators (URLs). Running the diagnostic script may also compile a set of proxy servers. Running the diagnostic script at an endpoint may also test a plurality of network paths from the endpoint. The plurality of network paths may be determined based, at least in part, on the set of URLs and the set of proxy servers.

Running the diagnostic script may also generate a set of diagnostic data. The diagnostic data may include a success status for each network path from the plurality of network paths. The diagnostic data may include a latency performance score for each network path from the plurality of network paths. The diagnostic data may also include a response size measurement for each network path from the plurality of network paths.

The platform may also include a big-data analysis module. The big-data analysis module may be based on the central server, and may be configured to collate, into a collated set of diagnostic data, the sets of diagnostic data that were generated by running the diagnostic script on two or more of the endpoints. The big-data analysis module may also be configured to analyze the collated set of diagnostic data based on a set of performance metrics. Based on the analyzing, the big-data analysis module may be configured to generate a diagnostic network report, and/or generate a flag when a network performance issue is detected.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
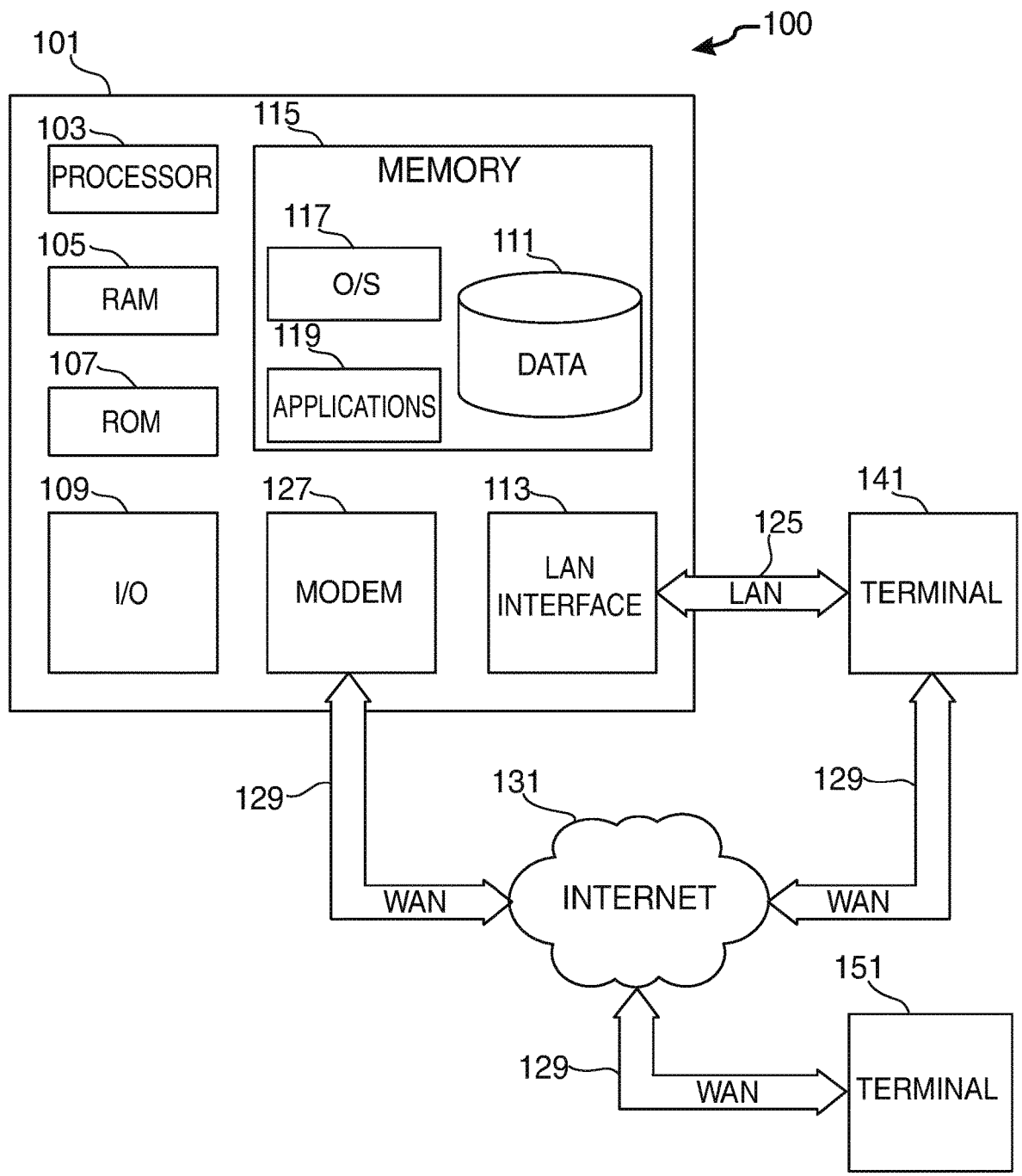
FIG. 1 shows an illustrative system in accordance with principles of the disclosure.

Aspects of the disclosure relate to a platform for identifying malfunctioning portions of a distributed computer network. The computer network may include a plurality of nodes. Each node may include one or more computer systems. One node may be a central server. The nodes may also include a plurality of endpoints. An endpoint may include a computer system, such as a workstation, that is used to access the network.

The platform may include an automated network agent module. The automated network agent module may be based on, or located at, the central server. Being based on, or located at, the central server may include being physically stored and/or run on the central server. It may also include being run logically at the central server. The automated network agent module may be configured to deploy and run a diagnostic script on one, two, or more of the endpoints. In certain preferred embodiments of the platform, the automated network agent module may be executed, at least in part, via Splunk.

Each instance of running the diagnostic script at an endpoint may be configured to compile a set of uniform resource locators (URLs). In some embodiments, the compiling may be performed in real-time for that instance. In other embodiments, the set may be precompiled. In still other embodiments, multiple sets may be precompiled, and the platform may select an appropriate set for this instance based on predetermined criteria. Predetermined criteria may include a size and/or location of the endpoint, a quality and/or quantity of communications performed by the endpoint, or any other suitable criteria.

Each URL in the set of URLs may be associated with one of a plurality of URL categories. Each URL category may be associated with a unique network routing protocol. The set of URLs may include at least two URLs that are associated with URL categories that are different from each other. For example, one URL may be of a financial institution. A second URL may be of a media outlet. A request to communicate with the first URL may require a higher level of security, and may therefore be routed via a network path that includes encryption. Including the first and second URLs in the set may increase the number of network paths that are tested by the script.

Running the diagnostic script may also compile a set of proxy servers. In some embodiments, the compiling may be performed in real-time for every execution of the script. Real-time compilation may include applying predetermined rules. One exemplary rule may be to include all the proxies connected to the endpoint at which the script is running. In other embodiments, the set of proxies may be precompiled. In still other embodiments, multiple sets may be precompiled, and the platform may select an appropriate set for this instance based on predetermined criteria. Predetermined criteria may include a size and/or location of the endpoint, a quality and/or quantity of communications performed by the endpoint, or any other suitable criteria.

Running the diagnostic script at an endpoint may test a plurality of network paths from the endpoint. The plurality of network paths may be determined based, at least in part, on the set of URLs and the set of proxy servers. For example, running the script at an endpoint against a set of 10 URLs and a set of 10 proxies may, in some circumstances, test 100 paths. The 100 paths may include the paths from the endpoint being tested to each URL, via all the proxies in the list.

Running the diagnostic script may generate a set of diagnostic data. The diagnostic data may include a success status for each network path from the plurality of network paths. A success status may indicate whether the communication succeeded or failed. Success or failure of a communication may be reflected by a response code, e.g., a code of 200 versus 404 or 500.

The diagnostic data may include a latency performance score for each network path from the plurality of network paths. Latency performance score may be a suitable measure of delay of a communication. The score may be a raw value that represents the time from sending to receiving. The score may represent a variance from an average time delay, e.g., compared to a communication over the same distance in the network.

The diagnostic data may also include a response size measurement for each network path from the plurality of network paths. The response size measurement may represent the size of the file, page, or other communication received in response to the communication.

The platform may include a big-data analysis module. Big-data analytics may refer to computational analysis of extremely large data sets to reveal patterns, trends, and associations. The big-data analysis module may be based on, or located at, the central server. Being based on, or located at, the central server may include being physically stored and/or run on the central server. It may also include being run logically at the central server. In certain preferred embodiments of the platform, the big-data analysis tool may be executed, at least in part, via Splunk.

The analysis module may be configured to collate, into a collated set of diagnostic data, the sets of diagnostic data that were generated by running the diagnostic script on two or more of the endpoints. The collated set of data may be a combination of the individual data sets generated by deploying and running the script at the endpoints. The collated set data may also include comparisons of the individual data sets. The comparisons may help identify performance issues.

The big-data analysis module may also be configured to analyze the collated set of diagnostic data based on a set of performance metrics. The performance metrics may include speed and reliability. Based on the analyzing, the big-data analysis module may be configured to generate a diagnostic network report. The diagnostic report may include all of the diagnostic data. The diagnostic report may include only the data that shows performance that is below, or more than a certain threshold below, an expected level of performance. The report may be generated on a predetermined schedule, e.g., once a minute, hour, day, week, or any other suitable time period. The report may also be generated on-demand, e.g., at the request of a network administrator.

The big-data analysis module may, additionally or alternatively, be configured to generate a flag when a network performance issue is detected. For example, the module may be configured to generate a flag when the diagnostic data indicates a performance that is below a certain threshold. For example, a flag may be generated when a communication has a delay that is 10% greater than average. The flag may, in some embodiments, be a message transmitted to a network administrator. The flag may also, in certain embodiments, include recommendations for resolving the problem. The recommendations may include an option to initiate a manual or automatic process to actually resolve the problem.

In some embodiments of the platform, the diagnostic script may be deployed and run on the two or more endpoints via the automated network agent module pursuant to a schedule. The schedule may include a temporal element and/or a sequential element. The schedule may include a predetermined temporal periodicity. For example, the schedule may deploy a script once every second, minute, hour, day, or other suitable time period.

The schedule may include deploying the script to some portion of the endpoints in the network every predetermined time period (e.g., half, or all of the endpoints every day). The schedule may include a daisy chain ordering sequence. For example, the schedule may deploy the scripts sequentially to the endpoints in an order that may be based on location or any other suitable ordering. The scripts may also, in some embodiments, be deployed to a portion of endpoints at substantially the same time. In some embodiments, the schedule may be determined, at least in part, with some level of randomness. For example, the platform may deploy scripts to 10% of the endpoints, selected randomly, every day. Schedules such as these may gather representative data about the network while minimizing a footprint of running the scripts, thereby increasing the productivity of the network while maintaining network health.

In certain embodiments, to analyze the collated set of diagnostic data, the platform may be configured to identify a portion of the computer network that is performing below a predetermined performance threshold. To identify the portion of the computer network that is performing below a predetermined performance threshold, the big-data analysis module may be configured to cross-reference the sets of diagnostic data from the two or more endpoints. The identifying may include locating an underperforming network path (or node contained in the path) that is common to at least two of the two or more endpoints. An underperforming network path may include a path associated with performance data that is below a predetermined threshold. For example, a path through which communications experience more than a 10% decrease in transmission speed. The analysis may, in certain embodiments, utilize artificial intelligence (AI) and/or machine learning (ML) techniques to identify and locate the underperforming paths.

In some embodiments of the platform, the diagnostic network report may include a graphical network map that may be displayed on a user interface (UI) associated with a network administrator. The graphical network map may include a graphical representation of nodes and paths in the computer network. The graphical network map may include performance data displayed in connection with the nodes and/or paths.

The graphical network map may further include a color-coded diagnostic reporting scheme. In the color-coded diagnostic reporting scheme, one or more of the performance metrics may be represented via a coloring of the network paths. For example, a malfunctioning node or path may be colored red.

A method for providing a remotely-deployed, automated, computer network diagnostic tool is provided. The method may include deploying a diagnostic script from a central network node to a first network endpoint via an automated network agent tool. The method may include running the diagnostic script on the first network endpoint. Running the diagnostic script on the first network endpoint may include generating a first set of diagnostic data.

The method may include deploying the diagnostic script from the central network node to one or more additional network endpoints via the automated network agent tool. The method may include running the diagnostic script on the one or more additional network endpoints. Running the diagnostic script on the additional network endpoints may include generating additional sets of diagnostic data.

The method may include collating the first set of diagnostic data and the one or more additional sets of diagnostic data into a collated set of diagnostic data. The method may include analyzing the collated set of diagnostic data based on a set of performance metrics. The analyzing may be performed via a big-data analysis tool. Based on the analyzing, the method may include generating a diagnostic network report, and/or generating a flag when a network performance issue is detected.

In some embodiments, running the diagnostic script on a network endpoint may include compiling a set of uniform resource locators (URLs). Running the script may also include compiling a set of proxy servers. Running the script may also include testing a variety of network paths from the network endpoint. The network paths may be determined based, at least in part, on the set of URLs and the set of proxy servers.

Running the script may also include generating a set of diagnostic data. The diagnostic data may include a success status for each network path from the plurality of network paths. The diagnostic data may include a latency performance score for each network path from the plurality of network paths. The diagnostic data may, additionally or alternatively, include a response size measurement for each network path from the plurality of network paths. The diagnostic data may also include any other suitable diagnostic network communication data.

In certain embodiments, each URL in the set of URLs may be associated with one of a plurality of URL categories. Each URL category may be associated with a unique network routing protocol. The set of URLs may include at least two URLs that are associated with URL categories that are different from each other. Including URLs of different categories may increase a diversity among the network paths that are tested by the script.

In some embodiments, the diagnostic script may be deployed and run via the network agent tool on a plurality of network endpoints pursuant to a schedule. The schedule may include a temporal element. The schedule may include a sequential element. The schedule may include a predetermined temporal periodicity. The schedule may include a daisy chain ordering sequence. The schedule may be determined, at least in part, with a level of randomness.

In certain embodiments of the method, analyzing the collated set of diagnostic data may include identifying a portion of the computer network that is performing below a predetermined performance threshold. In some embodiments, this identifying may include cross-referencing the diagnostic data from the plurality of network endpoints. The identifying may include locating an underperforming network path that is common to at least two of the plurality of network endpoints.

In some embodiments, the diagnostic network report may include a graphical network map. The graphical network map may be displayed on a user interface (UI) associated with a network administrator. The graphical network map may include a graphical representation of network nodes and network paths. The graphical network map may also include performance information associated with the displayed nodes and/or paths.

The graphical network map may, in certain embodiments, further include a color-coded diagnostic reporting scheme. The color-coded scheme may represent one or more performance metrics via a coloring of certain portions of the graphical network map.

In certain embodiments, the automated network agent tool and/or the big-data analysis tool may be executed, at least in part, via Splunk.

A remotely-deployed, automated, computer network diagnostic system is provided. The system may include computer executable code stored in non-transitory memory and configured to run on a processor.

The system may be configured to deploy a diagnostic script from a central network node to a first network endpoint via an automated network agent tool. The system may be configured to run the diagnostic script on the first network endpoint via the automated network agent tool. Running the diagnostic script on the first network endpoint may be configured to generate a first set of diagnostic data.

The system may be configured to deploy the diagnostic script from the central network node to one or more additional network endpoints via the automated network agent tool. The system may be configured to run the diagnostic script on the additional network endpoints. Running the diagnostic script on the additional network endpoints may be configured to generate additional sets of diagnostic data.

The system may be configured to collate the first set of diagnostic data and the additional sets of diagnostic data into a collated set of diagnostic data. The system may be configured to analyze the collated set of diagnostic data. The analysis may be performed via a big-data analysis tool. The analysis may be based, at least in part, on a set of performance metrics. Based on the analysis, the system may be configured to generate a diagnostic network report. The system may additionally or alternatively be configured to generate a flag when a network performance issue is detected.

Systems and methods in accordance with aspects of the disclosure may, in some embodiments, utilize computer executable code similar to the exemplary code shown in Tables A, B, and C below. The exemplary code may include specific languages, logic, steps, data structures, etc. for implementing certain embodiments. The specific implementations are not meant to limit the scope of the disclosure. Rather, they are meant to illustrate exemplary embodiments. Any other suitable languages, tools, libraries, algorithms, logic, and/or steps may be used to implement the methods and systems disclosed herein.

Table A shows exemplary code for one embodiment of a script that includes features of the disclosed processes shown and described herein. The script in Table A may be a PowerShell script. The script shown in Table A may be an exemplary diagnostic script that, when run at an endpoint, may generate diagnostic data about one or more network paths connected to the endpoint.

TABLE A

```
param (
    [switch]$NoSystemProxy = $false,
    [switch]$DontOpenReports = $false
)
##Configurable Variables
##Name of URL list file, put in same path as script
$URLListFile = "List-URLs.txt"
##Name of URL list file, put in same path as script
$ProxyListFile = "List-Proxies.txt"
##Default test URLs if URL list file is not found
##Example: $DefaultTestURLs = "https://www.google.com","http://www.google.com"
$DefaultTestURLs = "https://www.google.com","http://www.google.com",
"http://wiki.works.com/", "http://www.chase.com","http://tigernet.princeton.edu"
##Default test Proxies if Proxy list file is not found
$DefaultTestProxies =
"http://proxy1.com:8080","http://proxy2.com:8080","http://proxy3.com:8080",
"http://proxy4.com:8080", "http://proxy5.com:8080"
##Prefix name for output reports
$ReportPrefix = $env:computername + "_ProxyTestReport"
Build path variable where script was executed from
$scriptDir = Split-Path -Parent $MyInvocation.MyCommand.Path
Create a uniform script start timestamp
$ScriptStartTimestamp = get-date -Format "yyyy-MM-dd_hh.mm.ss"
String - registry path for current user IE settings
$regKeyIESettings="HKCU:\Software\Microsoft\Windows\CurrentVersion\Internet Settings"
$ACSURL = try
{
    (get-ItemProperty -path $regKeyIESettings AutoConfigURL -ErrorAction Stop).AutoConfigURL
}
Catch
{
"Direct/No PAC Script configured"
}
Build full URL List filename
$URLListFile = $scriptDir+"\"+$URLListFile
Build full Proxy List filename
$ProxyListFile = $scriptDir+"\"+$ProxyListFile
Build Output Report File List filename
$FinalOutFile = $scriptDir+"\"+$ReportPrefix+"-"+$ScriptStartTimestamp+".htm"
$FinalCSVOutFile = $scriptDir+"\"+$ReportPrefix+"-"+$ScriptStartTimestamp+".csv"
Read URL list to test or if not exist, set test against default URLs
$URLList = $null
$URLList = @(try
{
    Get-Content $URLListFile -ErrorAction Stop
}
catch
{
    $DefaultTestURLs
})
Read URL list to test or if not exist, set test against default URLs
$ProxyList = $null
$ProxyList = @(try
{
    Get-Content $ProxyListFile -ErrorAction Stop
}
catch
{
    $DefaultTestProxies
})
##C# code snippet to allow PowerShell to add TLS 1.1 and 1.2 and remove SSL3 as
available schannel protocols, default is only SSL3 and TLS1.0
$Source = @"
using System;
using System.Net;
namespace dhpScript.Tools
{
```

TABLE A-continued

```
  public static class ModifySecurityProtocols
  {
    public static void AddTLS11( )
    {
      System.Net.ServicePointManager.SecurityProtocol |=
SecurityProtocolType.Tls11;
    }
    public static void AddTLS12( )
    {
      System.Net.ServicePointManager.SecurityProtocol |=
SecurityProtocolType.Tls12;
    }
    public static void RemoveSSL3( )
    {
      System.Net.ServicePointManager.SecurityProtocol &=
~SecurityProtocolType.Ssl3;
    }
  }
}
"@
Add-Type -TypeDefinition $Source -Language CSharp
##Call the C# code to add TLS 1.1 and 1.2 and then remove SSL3
[dhpScript.Tools.ModifySecurityProtocols]::AddTLS11( )
[dhpScript.Tools.ModifySecurityProtocols]::AddTLS12( )
[dhpScript.Tools.ModifySecurityProtocols]::RemoveSSL3( )
##Output script operating parameters to console
Write-Progress -Activity "Proxy Test Script" -Status "Version 2.3 - Date 06 Aug 2019" -
Write-Host"**************"
Write-Host "Starting tests: $($URLList.Count) URLs to be tested"
#Write-Host "$($URLList.Count) URLs to be tested"
Write-Progress -Activity "$($URLList.Count) URLs to be tested" -Id 2 -ParentId 1 -
Status " "
If ($NoSystemProxy -eq $false)
{
   Write-Host "$($ProxyList.Count + 1) Proxy tests will be run for each URL,
$($ProxyList.Count) proxies from list file as well as the IE/system Proxy config"
   Write-Host"**************"
   Write-Host "Your current IE Proxy Auto Config points to: $ACSURL"
   Write-Host"**************"
   Write-Host ""
   Write-Progress -Activity "$($ProxyList.Count + 1) Proxy tests will be run for each
URL, $($ProxyList.Count) proxies from list file as well as the IE/system Proxy config" -
Status "Your current IE Proxy Auto Config points to: $ACSURL" -Id 3 -
CurrentOperation "The system proxy will be used" -ParentId 1
}
Else
{
   Write-Host "$($ProxyList.Count) Proxies to be tested, only from list file"
   Write-Host "**************"
   Write-Host ""
   Write-Progress -Activity "$($ProxyList.Count) Proxies to be tested, only from list file"
-Status " " -Id 3 -ParentId 1
}
if ($URLList.Count -eq 0){
Write-Host "Found no URLs test which most likely means an empty URL list file,
terminating script early"
exit
}
if ($ProxyList.Count -eq 0){
Write-Host "No proxies configured to be tested. This most likely means you used the -
NoSystemProxy switch AND have an empty Proxy list file, terminating script early"
exit
}
#Write-Progress -Activity "Processing URLs" -Id 4 -Status " " -CurrentOperation " " -
PercentComplete 0
#Write-Progress -Activity "Processing Proxies" -Id 5 -Status " " -CurrentOperation " " -
PercentComplete 0
##create $Result as an empty array
$Result = @( )
##start timer for this overall test
$TotalDefaultProxyTestStopwatch = [system.diagnostics.stopwatch]::StartNew( )
##Initialize URL loop counter
$URLloopCount = 0
##Iterate through each URL
$URLList.ForEach({
#Foreach($Uri in $URLList) {
   #count URL loop iteration
   $URLloopCount = $URLloopCount + 1
   #Initialize Proxy loop counter
   $ProxyloopCount = 0
```

TABLE A-continued

```
  #set the temporary variables to/back to null
  $request = $null
  $proxy = $null
  $PACproxy = $null
  $ProxyLoopList = $null
  $result1 = $null
  #Using IF statement, check for -NoSystemProxy flag, and add it to the proxy list if
$false
  #
  If ($NoSystemProxy -eq $false)
  {
     $PACproxy = [System.Net.WebRequest]::GetSystemWebProxy( ).GetProxy($_)
     $ProxyLoopList = @($PACproxy.OriginalString) + $ProxyList
  }
  Else
  {
     $ProxyLoopList = $ProxyList
  }
  #inform user of URL currently being tested
  Write-Host ""
  Write-Host "URL $URLloopCount of $($URLList.Count): $_"
  Write-Progress -Activity "Processing URL list" -Id 4 -Status "Currently testing URL
$URLloopCount of $($URLList.Count)" -CurrentOperation "URL: $_" -
PercentComplete ($URLloopCount/$($URLList.Count)*100)
  Foreach($proxy in $ProxyLoopList){
     #count URL loop iteration
     $ProxyloopCount = $ProxyloopCount + 1
     # Start a stopwatch to time this individual test
     $SingleTestStopwatch = [system.diagnostics.stopwatch]::StartNew( )
     #inform user of current proxy test
     If(($ProxyloopCount -eq 1) -and ($NoSystemProxy -eq $false))
     {
        If($proxy -eq $_){Write-Host " Proxy Test $ProxyloopCount of
$($ProxyLoopList.Count): Proxy: from PAC eval: None/Direct Connection"}
          Else {Write-Host " Proxy Test $ProxyloopCount of $($ProxyLoopList.Count):
Proxy: from PAC eval: $proxy"}
     }
     Else
     {
        If($proxy -eq $_){Write-Host "Proxy Test $ProxyloopCount of
$($ProxyLoopList.Count): Proxy: None/Direct Connection"}
          Else {Write-Host "Proxy Test $ProxyloopCount of $($ProxyLoopList.Count):
Proxy: $proxy"}
     }
     If($proxy -eq $_) {
     Write-Progress -Activity "Requesting URL via Direct Connection" -Id 5 -ParentId 4
-Status "Proxy $ProxyloopCount of $($ProxyLoopList.Count)" -PercentComplete
($ProxyloopCount/$($ProxyLoopList.Count)*100)
     }
     Else{
     Write-Progress -Activity "Proxy $ProxyloopCount of $($ProxyLoopList.Count)" -Id
5 -ParentId 4 -Status "Requesting URL via Proxy: $proxy" -PercentComplete
($ProxyloopCount/$($ProxyLoopList.Count)*100)
     }
     #try block - attempt the connection, if it fails do the catch block
     $time = try{
     <#Test if the URI and the Proxy address are the same. If
       they are, make a direct connection instead of using a proxy.
       If not, make a connection using the designated proxy.
       In both cases, measure how long the response took,
       return the web request object as $request and time taken
       in milliseconds as $time#>
     $progressPreference = 'silentlyContinue'
     If($proxy -eq $_){$result1 = Measure-Command { $request = Invoke-WebRequest -
Uri $_ -UseDefaultCredentials -UseBasicParsing } }
        Else{$result1 = Measure-Command { $request = Invoke-WebRequest -Uri $_ -
Proxy $proxy -ProxyUseDefaultCredentials -UseDefaultCredentials -UseBasicParsing }
}
       $result1.TotalMilliseconds
     }
     catch {
        <# If the request in the try block generated an exception (i.e.: 500 server
          error or 404 not found), pull the status code from the Exception.Response
property.
          Return the single test stopwatch elapsed time in milliseconds as $time #>
          $request = $_.Exception.Response
          $SingleTestStopwatch.ElapsedMilliseconds
     }
     $progressPreference = 'Continue'
     #clear out the single test stopwatch
```

TABLE A-continued

```
    $SingleTestStopwatch = $null
    #Format Time Taken into *.xxx
    If($time -ne "−1"){$time = [System.Math]::Round(($time / 1000), 3)}
    <#Test if the URI and the Proxy address are the same,
     if yes then update proxy string to indicate direct connection#>
    If($proxy -eq $_){$proxy = "Direct/No Proxy Used"}
    #add the test output as a custom object to the $Result array
    $result += [PSCustomObject] @{
      ComputerName = $env:computername;
      Time = get-date -Format "yyyyMMdd HH:mm:ss:ffff";
      Uri = $_;
      ProxyUsed = "$proxy";
      StatusCode = [int] $request.StatusCode;
      StatusDescription = If($request.StatusCode -eq $null ){"Unable to
connect"}Else{$request.StatusDescription};
      #StatusDescription = $request.StatusDescription;
      ResponseLength = $request.RawContentLength;
      ProxyLoopCount = $ProxyloopCount;
      TimeTaken = $time;
    }
    #output test result info to the console
    $DisplayStatusCode = [int] $request.StatusCode;
    $DisplayStatusDescription = If($request.StatusCode -eq $null ) {"Unable to
connect"}Else{$request.StatusDescription};
    Write-Host " Time Elapsed: $time Seconds"
    Write-Host " Status Code: $DisplayStatusCode; $DisplayStatusDescription"
   }
  })
##stop the total test stopwatch
$TotalDefaultProxyTestStopwatch.Stop( )
##clear out the URL loop counter
$URLloopCount = $null
##output to console that tests are finished
Write-Host ""
Write-Host "**************"
Write-Host "Completed tests"
Write-Host "**************"
Write-Host ""
Prepare HTML block for output
$Outputreport = "<HTML><TITLE>Proxy Test Report
$ScriptStartTimestamp</TITLE><BODY background-color:peachpuff ><font color
=""#99000"" face=""Microsoft Tai le""><H2> Proxy Test Report
$ScriptStartTimestamp</H2></font>"
if($result -ne $null)
{
   If ($NoSystemProxy -eq $false)
   {
      $Outputreport += "<H3> Testing $($URLList.Count) URL(s) against
$($ProxyList.Count + 1) Proxies, $($ProxyList.Count) from proxy list file plus the
configured IE/System Default Proxy: $ACSURL</H3>"
   }
   Else
   {
      $Outputreport += "<H3>Testing $($URLList.Count) URL(s) against
$($ProxyList.Count) Proxies from file</H3>"
   }
   $tempseconds = $TotalDefaultProxyTestStopwatch.Elapsed
   $TotalDefaultProxyTestStopwatch = $null
   $Outputreport += "Total Test Run time: $tempseconds<br>"
   Write-Host "Total Test Run time: $tempseconds"
   $ContextUsername=[Environment]::UserName
   $Outputreport += "User: $ContextUsername <br><br>"
   $Outputreport += "<Table border=1 cellpadding=3 cellspacing=0><TR bgcolor=gray
align=center><TD><B>URL</B></TD><TD><B>ProxyUsed</B></TD><TD><B>Stat
usCode</B></TD><TD><B>StatusDescription</B></TD><TD><B>ResponseLength
</B></TD><TD><B>TimeTaken</B></TD></TR>"
   $Result.ForEach(
      {
      if($_.StatusCode -ne "200")
      {
         $Outputreport += "<TR bgcolor=red>"
      }
      else
      {
         $Outputreport += "<TR>"
      }
      If(($ProxyloopCount -eq 1) -and ($NoSystemProxy -eq $false))
      {
         $Outputreport += "<TD align=left>$($_.uri)</TD><TD align=left>PAC eval:
$($_.ProxyUsed)</TD><TD align=center>$($_.StatusCode)</TD><TD
```

TABLE A-continued

```
align=center>$($_.StatusDescription)</TD><TD
align=center>$($_.ResponseLength)</TD><TD
align=center>$($_.timetaken)</TD></TR>"
        }
    Else
        {
        $Outputreport += "<TD align=left>$($_.uri)</TD><TD
align=left>$($_.ProxyUsed)</TD><TD align=center>$($_.StatusCode)</TD><TD
align=center>$($_.StatusDescription)</TD><TD
align=center>$($_.ResponseLength)</TD><TD
align=center>$($_.timetaken)</TD></TR>"
        }
    })
    $Outputreport += "</Table>"
}
$Outputreport += "<br><H3></H3>"
$Outputreport +="</BODY></HTML>"
# Output the HTML report to file
$Outputreport | out-file $FinalOutFile
$Result | Export-Csv $FinalCSVOutFile -NoTypeInformation -NoClobber
If ($DontOpenReports -eq $false)
{
# Open the report in default browser
Invoke-Expression $FinalOutFile
Invoke-Expression $FinalCSVOutFile
}
```

Table B shows an exemplary "List of Proxies." The exemplary "List of Proxies" shown in Table B may be used in conjunction with the exemplary diagnostic script shown above in Table A.

TABLE B

List of Proxies http://proxy1.com:8080
http://proxy2.com:8080
http://proxy3.com:8080
http://proxy4.com:8080
http://proxy5.com:8080
http://proxy6.com:8080
http://proxy7.com:8080
http://proxy8.com:8080
http://proxy9.com:8080
http://proxy10.com:8080
http://proxy11.com:8080
http://proxy12.com:8080
http://proxy13.com:8080
http://proxy14.com:8080
http://proxy15.com:8080
http://proxy16.com:8080
http://proxy17.com:8080
http://proxy18.com:8080
http://proxy19.com:8080
http://proxy20.com:8080
http://proxy21.com:8080
http://proxy22.com:8080
http://proxy23.com:8080
http://proxy24.com:8080
http://proxy25.com:8080

Table C shows an exemplary "List of URLs." The exemplary "List of URLs" shown in Table C may include URLs from multiple URL categories. The exemplary "List of URLs" shown in Table C may be used in conjunction with the exemplary diagnostic script shown above in Table A.

TABLE C

List of URLs https://wsj.com
https://www.wsj.com

TABLE C-continued

List of URLs http://example.com
https://chase.com
https://secure.reged.com
https://www.msnbc.com
http://taco.com/
https://taco.com/
https://finance.yahoo.com
https://google.com
https://www.webex.com/

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to performing computer network diagnostics. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to performing computer network diagnostics.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
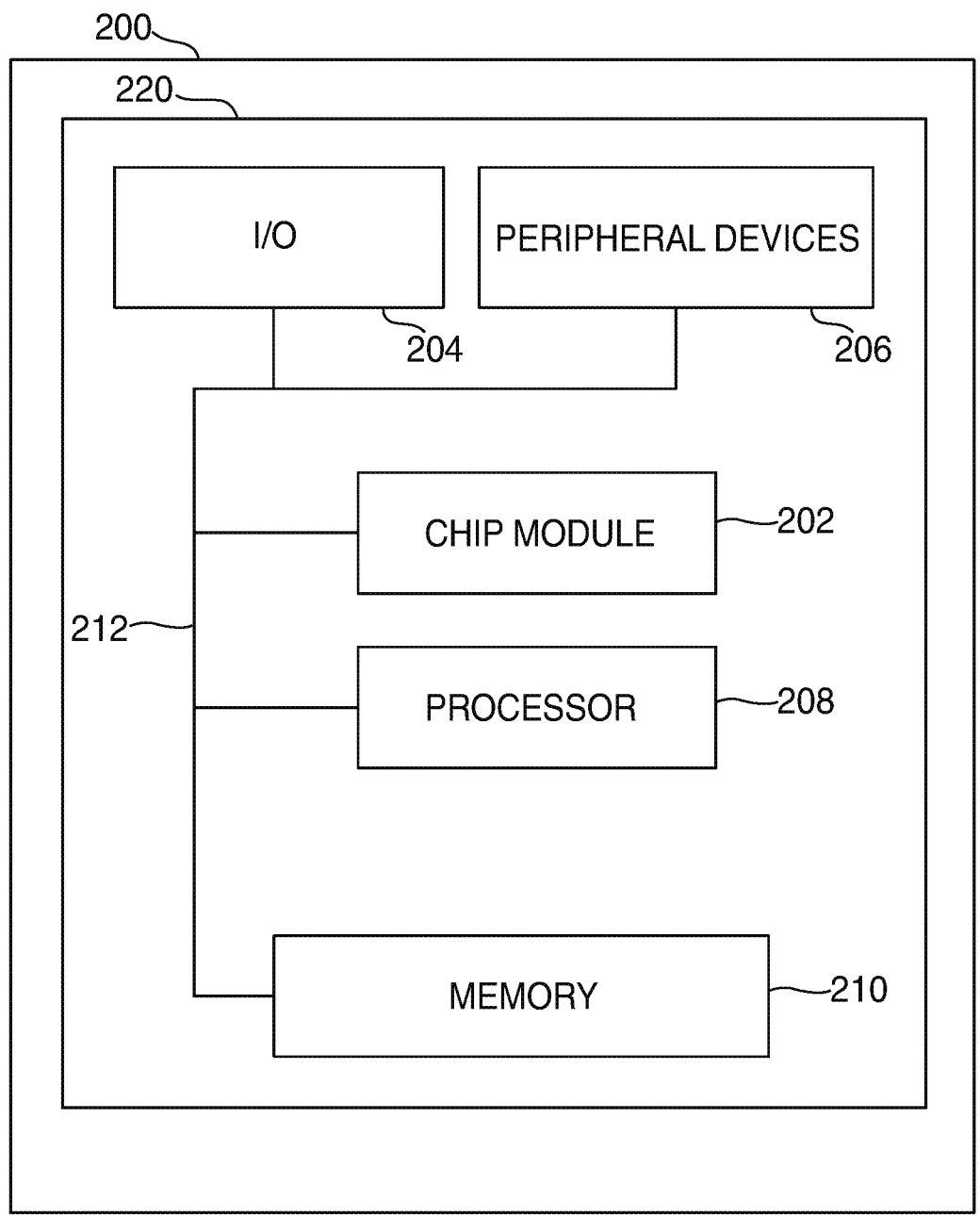
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3A:
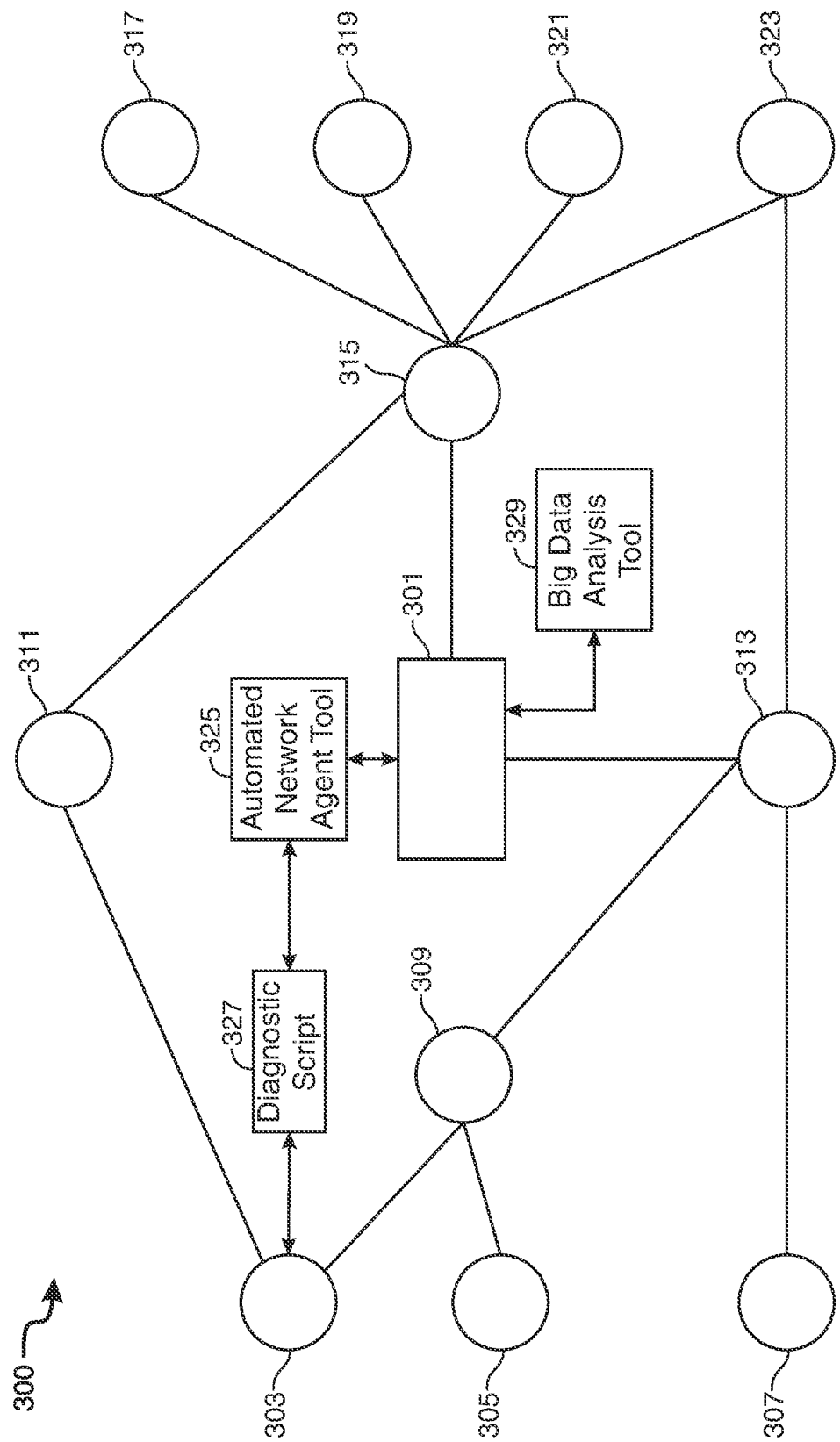
FIG. 3A shows an illustrative diagram in accordance with principles of the disclosure.

FIG. 3A shows illustrative diagram 300 according to aspects of the disclosure. Diagram 300 may show an exemplary distributed computer network. The network may include central server 301. The network may include additional nodes 303-323. Some or all of nodes 303-323 may be network endpoints. Some or all of nodes 303-323 may be connected to the network via one or more proxy servers. Diagram 300 shows that some of the nodes are interconnected via lines representing network paths.

The exemplary distributed computer network shown in diagram 300 may be used to illustrate an exemplary use case for aspects of the disclosed system. The system may detect errors or delays when node 303 communicates with node 323. The detection may occur via deploying, via automated network agent tool 325, and running diagnostic script 327 at node 303. Based on this detection, however, it is not known which of many paths between nodes 303 and 323 are experiencing a malfunction. The system may deploy and run the script at node 307. If node 307 also has errors or delays communicating with node 323, it is likely that the malfunction is located at node 313, node 323, or along the path connecting nodes 313 and 323. The system may deploy and run the script at node 315, and ascertain that there is no problem communicating with node 323. This may narrow the malfunctioning portion to node 313 or the path between nodes 313 and 323. If the system tests any communication to node 313 and also discovers no problems, the system may ultimately determine that the malfunction is located along the path from node 313 to 323. The system may implement big data analysis tool 329 in making the determination.

To illustrate with a real-world example, a diagnostic script, similar to the exemplary scripts shown in Tables A, B, and C above, was successfully used to diagnose an actual problem with a large distributed computer network. Endpoints throughout the network were experiencing communication delays and the source of the problem was unclear. The script was deployed and run at multiple endpoints, including a computer system in NY and in Boston. An analysis of the data generated by the scripts pinpointed the malfunction to a data center in San Francisco.

In some embodiments, the system may take predetermined steps to fix the malfunction once located.

Figure 3B:
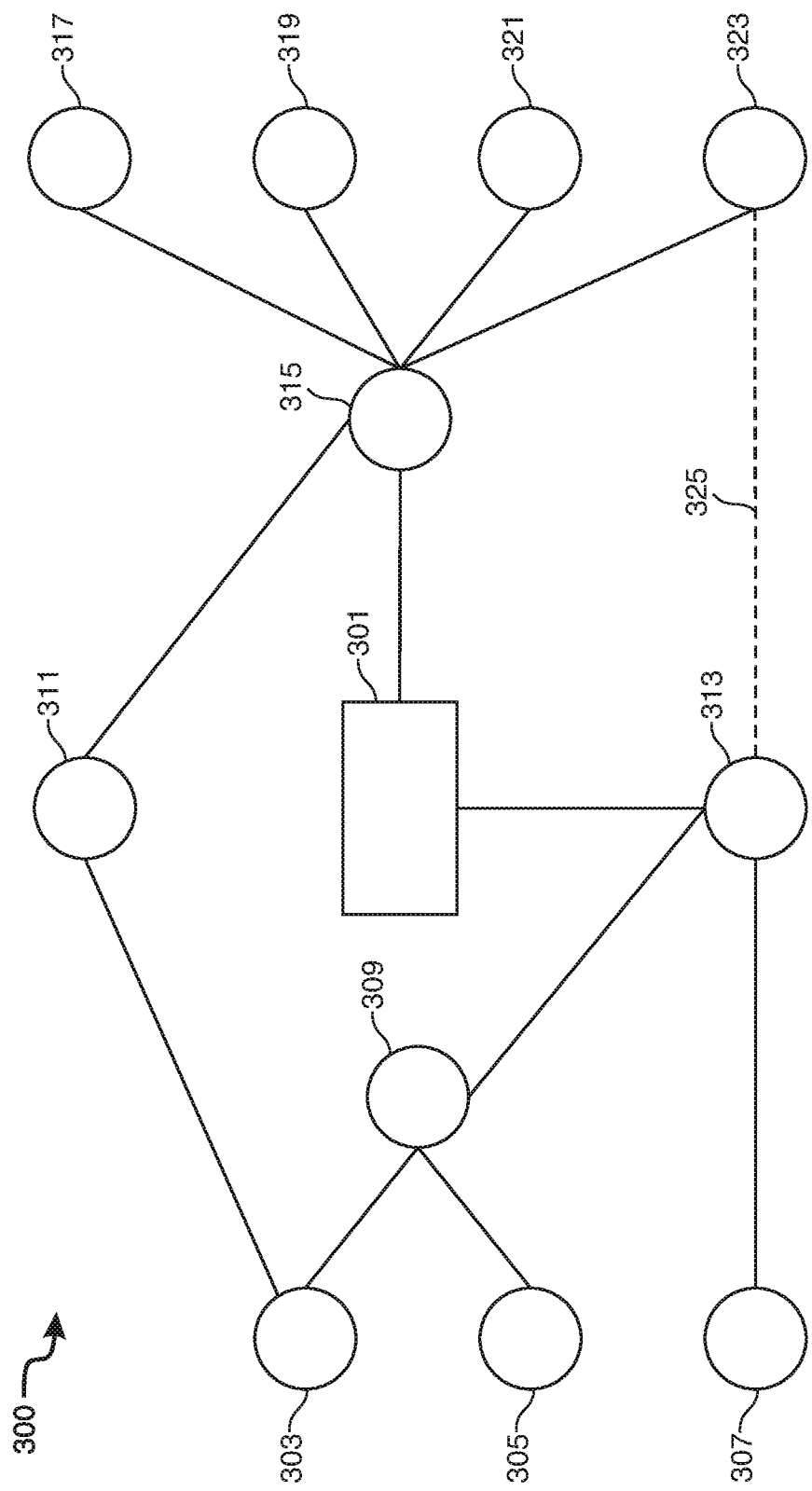
FIG. 3B shows another illustrative diagram in accordance with principles of the disclosure.

In some embodiments the system may generate a graphical network map. An exemplary graphical network map is shown in FIG. 3B. The map may display the location of the network malfunction, such as the exemplary malfunction described above, by highlighting malfunctioning path 325. Highlighting malfunctioning path 325 may include coloring the path in a certain color. The color may, for example, be red.

Figure 4:
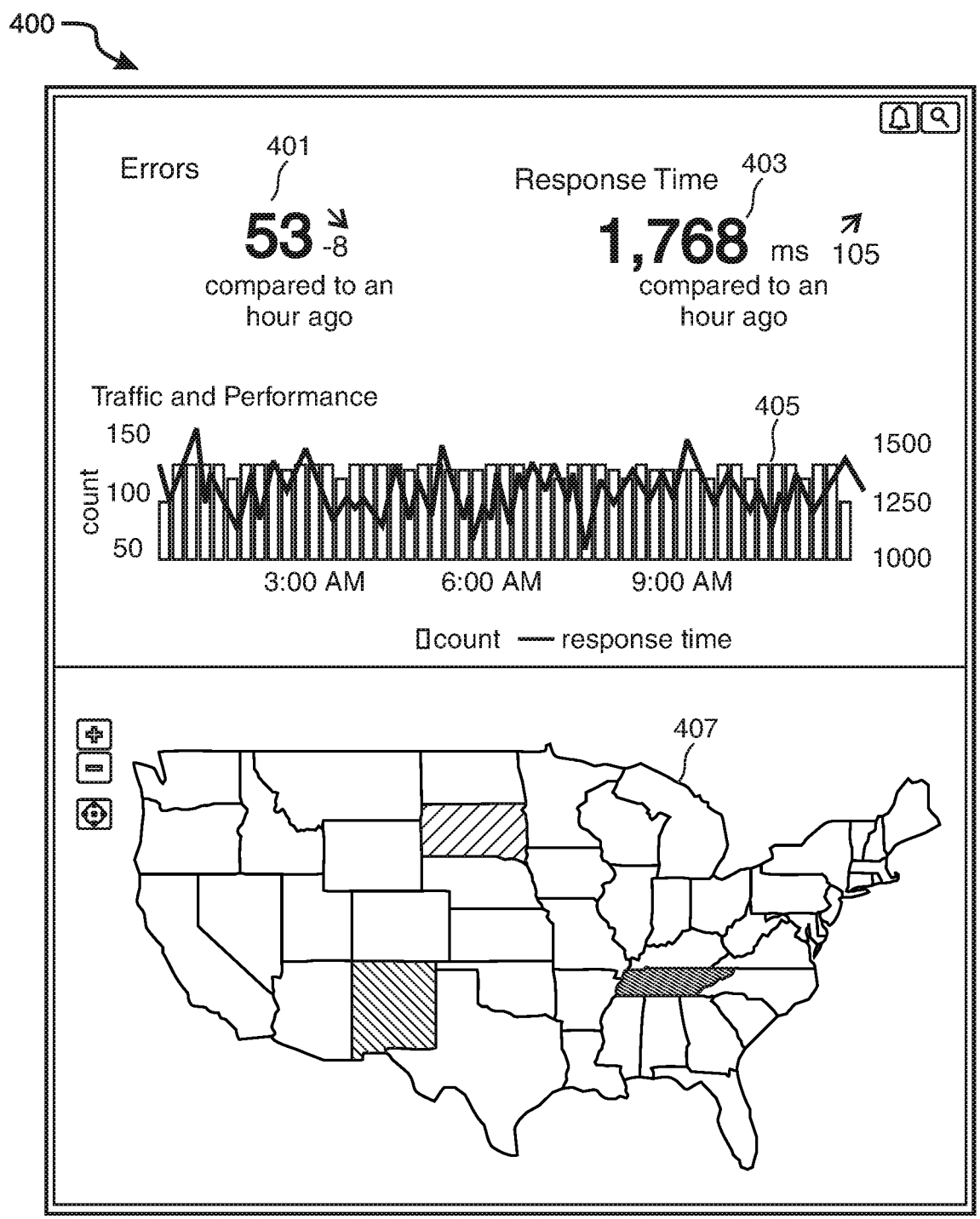
FIG. 4 shows an illustrative screenshot in accordance with principles of the disclosure.

FIG. 4 shows illustrative screenshot 400 according to aspects of the disclosure. Screenshot 400 may show an exemplary diagnostic report generated by the system. The diagnostic report may include information in formats such as maps, graphs, and charts as shown in screenshot 400. The diagnostic report may also include any other suitable information in any other suitable format.

For example, screenshot 400 shows error indicator 401. Error indicator 401 may indicate a number of errors encountered in the system. Error indicator 401 may also indicate a delta between the current error count and the number of errors from a predetermined time in the past, e.g., an hour ago. Screenshot 400 also shows response time indicator 403. Response time indicator 403 may indicate a current response time for communications in the system. Response time indicator 403 may also indicate a delta between current response time and the response time from a predetermined time in the past, e.g., an hour ago.

Screenshot 400 also shows exemplary graph 405. Exemplary graph 405 may show a line graph that may indicate response time. The line graph may be overlaid on a bar graph that may show a traffic count in the system. Both graphs may be shown along a time axis.

Screenshot 400 also shows exemplary network map 407. Map 407 may show a map of a region of the network, in this case a map of the USA. The map may include shadings or colorings that may indicate performance metrics. For example, a first portion of the map may be lightly shaded and a second portion may be more heavily shaded. The shadings may indicate a traffic pattern that may be light in the first portion and heavier in the second. The shadings may indicate a delay level that may be light in the first portion and heavier in the second.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for remotely-deployed automated computer network diagnostic tools are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for providing a remotely-deployed, automated, computer network diagnostic tool, the method comprising:
deploying a diagnostic script from a central network node to a first network endpoint via an automated network agent tool;
running the diagnostic script on the first network endpoint via the automated network agent tool;
generating a first set of diagnostic data via the running the diagnostic script on the first network endpoint;

deploying the diagnostic script from the central network node to one or more additional network endpoints via the automated network agent tool;
running the diagnostic script on the one or more additional network endpoints via the automated network agent tool;
generating one or more additional sets of diagnostic data via the running the diagnostic script on the one or more additional network endpoints;
collating the first set of diagnostic data and the one or more additional sets of diagnostic data into a collated set of diagnostic data;
via a big-data analysis tool, analyzing the collated set of diagnostic data based on a set of performance metrics; and
based on the analyzing, generating:
 a diagnostic network report; and/or
 a flag when a network performance issue is detected;
wherein running the diagnostic script on a network endpoint comprises:
 compiling a set of uniform resource locators (URLs);
 compiling a set of proxy servers;
 testing a plurality of network paths from the network endpoint, the plurality of network paths determined based at least in part on the set of URLs and the set of proxy servers; and
 generating a set of diagnostic data, said diagnostic data comprising:
  a success status for each network path from the plurality of network paths;
  a latency performance score for each network path from the plurality of network paths; and
  a response size measurement for each network path from the plurality of network paths.

2. The method of claim 1, wherein each URL in the set of URLs is associated with one of a plurality of URL categories, each URL category associated with a unique network routing protocol, and the set of URLs comprises at least two URLs that are associated with URL categories that are different from each other, thereby increasing a diversity among the plurality of network paths.

3. The method of claim 1, wherein the diagnostic script is deployed and run via the network agent tool on a plurality of network endpoints pursuant to a schedule, said schedule comprising a temporal element and/or a sequential element, wherein said schedule:
 comprises a predetermined temporal periodicity and/or a daisy chain ordering sequence; and/or
 is determined, at least in part, at random.

4. The method of claim 1, wherein the analyzing the collated set of diagnostic data comprises identifying a portion of the computer network that is performing below a predetermined performance threshold.

5. The method of claim 4, wherein the identifying comprises cross-referencing the diagnostic data from the plurality of network endpoints and locating an underperforming network path that is common to at least two of the plurality of network endpoints.

6. The method of claim 1, wherein the diagnostic network report comprises a graphical network map that is displayed on a user interface (UI) associated with a network administrator, said graphical network map comprising a graphical representation of a plurality of network nodes and a plurality of network paths interconnecting said plurality of network nodes.

7. The method of claim 6, wherein the graphical network map further comprises a color-coded diagnostic reporting scheme, wherein one or more of the set of performance metrics are represented via a coloring of each network path of the plurality of network paths displayed in the graphical network map.

8. The method of claim 1, wherein the automated network agent tool and/or the big-data analysis tool are executed, at least in part, via Splunk.

9. A remotely-deployed, automated, computer network diagnostic system, the system comprising computer executable code stored in non-transitory memory and configured to run on a processor, wherein the system is configured to:
 deploy a diagnostic script from a central network node to a first network endpoint using an automated network agent tool;
 run the diagnostic script on the first network endpoint via the automated network agent tool;
 generate a first set of diagnostic data in response to the running the diagnostic script on the first network endpoint;
 deploy the diagnostic script from the central network node to one or more additional network endpoints using the automated network agent tool;
 run the diagnostic script on the one or more additional network endpoints using the automated network agent tool;
 generate one or more additional sets of diagnostic data in response to the running the diagnostic script on the one or more additional network endpoints;
 collate the first set of diagnostic data and the one or more additional sets of diagnostic data into a collated set of diagnostic data;
 using a big-data analysis tool, analyze the collated set of diagnostic data based on a set of performance metrics; and
 based on the analyzing, generate:
  a diagnostic network report; and/or
  a flag when a network performance issue is detected;
wherein running the diagnostic script on a network endpoint is configured to:
 compile a set of uniform resource locators (URLs), wherein each URL in the set of URLs is associated with one of a plurality of URL categories, each URL category associated with a unique network routing protocol, and the set of URLs comprises at least two URLs that are associated with URL categories that are different from each other;
 compile a set of proxy servers;
 test a plurality of network paths from the network endpoint, the plurality of network paths determined based at least in part on the set of URLs and the set of proxy servers; and
 generate a set of diagnostic data, said diagnostic data comprising:
  a success status for each network path from the plurality of network paths;
  a latency performance score for each network path from the plurality of network paths; and
  a response size measurement for each network path from the plurality of network paths.

10. The system of claim 9, wherein the diagnostic script is deployed and run via the network agent tool on a plurality of network endpoints pursuant to a schedule, said schedule comprising a temporal element and/or a sequential element, wherein said schedule:
 comprises a predetermined temporal periodicity and/or a daisy chain ordering sequence; and/or
 is determined, at least in part, at random.

11. The system of claim 9, wherein, to analyze the collated set of diagnostic data, the system is configured to identify a portion of the computer network that is performing below a predetermined performance threshold, and wherein, to identify the portion of the computer network that is performing below a predetermined performance threshold, the system is configured to cross-reference the diagnostic data from the plurality of network endpoints and/or to locate an underperforming network path that is common to at least two of the plurality of network endpoints.

12. The system of claim 9, wherein the diagnostic network report comprises a graphical network map that is displayed on a user interface (UI) associated with a network administrator, said graphical network map comprising a graphical representation of a plurality of network nodes and a plurality of network paths interconnecting said plurality of network nodes; and the graphical network map further comprises a color-coded diagnostic reporting scheme, wherein one or more of the set of performance metrics are represented via a coloring of each network path of the plurality of network paths displayed in the graphical network map.

13. The system of claim 9, wherein the automated network agent tool and/or the big-data analysis tool are executed, at least in part, using Splunk.

* * * * *